United States Patent Office 3,000,747
Patented Sept. 19, 1961

3,000,747
ESTER OF 2,2 DIMETHYL-HYDRACRYLIC ACID, 3 HYDROXY 2,2 DIMETHYLPROPYL ESTER AND RESINOUS MATERIALS PLASTICIZED THEREWITH
James C. Martin and Kent C. Brannock, Kingsport, Tenn., assignors to Eastman Kodak Company, Rochester, N.Y., a corporation of New Jersey
No Drawing. Filed Mar. 14, 1958, Ser. No. 721,363
12 Claims. (Cl. 106—180)

This invention relates to improvements in plastic compositions, and more particularly, to plasticizing cellulose ester and polyvinyl chloride resins.

In the preparation of cellulose ester and polyvinyl chloride resins for various uses, it is common practice in the art to modify their properties by the addition of materials having a plasticizing or softening action. It is a requisite of plasticizing materials that they have such properties as low volatility, water resistance and compatibility with the resin being plasticized.

Low boiling plasticizers evaporate slowly on standing at room temperature or at temperatures to which the cellulose ester and polyvinyl resin is subjected to, either in preparation or in use. As a result, films or molded articles thereof become brittle and may easily crack or break.

Also, resins may be subjected to water in their use. If the plasticizer is water soluble to even a small extent, the plasticizer is ultimately leached out and the resin becomes hard and brittle.

If the plasticizer is not compatible in the proportions generally used in cellulose ester and polyvinyl chloride resins, the plasticizer will exude from films and molded articles to give an oily feel to these articles. Here again, loss of the plasticizer material from the resin results in a reversion to the resin's original hardness and brittleness.

Most compounds tested as possible plasticizers for cellulose esters and polyvinyl chloride resins fail in one or more of the necessary and desired properties of low volatility, water-resistance and compatibility. Hence, the only sure way of determining the suitability of a likely compound as a plasticizer in these resins is to actually test the compound in the resin.

It is an object of this invention to provide plastic compositions comprising cellulose ester and polyvinyl chloride resins plasticized with a new plasticizer.

It is another object of this invention to provide a new plasticizer that has low volatility, is water resistant and is compatible in cellulose ester and polyvinyl chloride resins.

It is still another object of this invention to provide a novel class of plasticizers for cellulose esters and polyvinyl chloride resins that are relatively inexpensive to manufacture.

It is likewise an object of this invention to provide a new class of esters having a diversity of uses.

These and other objects of the invention are accomplished by means of this invention as described more fully hereinafter with reference to preferred embodiments thereof.

The novel compounds of the invention are esters of 2,2 - dimethylhydracrylic acid, 3 - hydroxy - 2,2 - dimethylpropyl ester, which esters can be represented by the following structural formula:

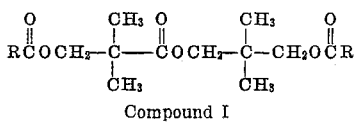

Compound I wherein R is an alkyl radical having 1 to 10 carbon atoms. The substituent R of Compound I can be either straight-chained or branched-chained alkyl radicals, typical of the substituents being methyl, ethyl, n-propyl, isopropyl, n-butyl, iso-butyl, n-amyl, n-hexyl, n-heptyl, n-octyl, 2 - ethyl-n-hexyl, n-nonyl, 2 - methyl-n-octyl, n-decyl and related alkyl radicals.

The diol, 2,2-dimethylhydracrylic acid, 3-hydroxy-2,2-dimethylpropyl ester, used in preparing the esters of the invention can be readily prepared by reacting two molecules of 2,2-dimethylhydracrylaldehyde in accordance with the Tishchenko reaction as represented by the following equation:

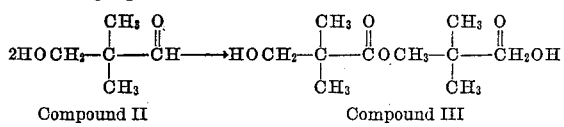

Compound II          Compound III

Thereafter, the diol, Compound III, is esterified with a suitable organic acid

wherein R is an alkyl radical as described above) to prepare the subject esters represented generically by Compound I. Compound III can be esterified by conventional methods. A preferred method is to reflux one molar proportion of Compound III with at least two molar proportions of the organic acid in an inert solvent such as toluene or xylene at a temperature of 175–250° C. in a reactor fitted with a Dean-Stark trap to remove the water formed during the esterification, no catalyst being needed to effect the esterification. The solvent used in the esterification, as well as low boiling reaction products can be readily stripped off the resulting reaction product with usual distillation apparatus, and the subject ester, Compound I, separated by thin film molecular distillation.

Cellulose esters can be plasticized with the esters of 2,2-dimethylhydracrylic acid, 3-hydroxy-2,2-dimethylpropyl ester described herein, namely, normally solid cellulose esters of fatty acids having 2 to 4 carbon atoms. Typical cellulosic resins that can be suitably plasticized in accordance with the invention include cellulose triacetate, cellulose acetate butyrate and the like. Suitable cellulose acetate butyrate resins typically have a 5 to 20% acetyl content and a 25 to 50% butyryl content. The subject plasticizers are used in cellulose esters at concentrations of about 10 to 50%, with concentrations of about 10 to 30% being preferably used with cellulose acetate butyrates, and concentrations of about 20 to 40% being preferably used with cellulose triacetate. The afore-mentioned concentrations are based on the combined weight of the cellulosic resin and the plasticizer. The substituent R of Compound I can be an alkyl radical containing 1 to 10 carbon atoms in suitable compounds for plasticizing cellulosic esters, and preferably 1 to 4 carbon atoms for plasticizing cellulose triacetate, and preferably 3 to 10 carbon atoms for plasticizing cellulose acetate butyrate.

Normally solid polyvinyl chloride resins are well-known in the art and can also be plasticized with the subject esters of 2,2-dimethylhydracrylic acid, 3-hydroxy-2,2-dimethylpropyl ester. The present plasticizers can be used in polyvinyl chlorides at concentrations of about 10 to 50%, with concentrations of 30 to 50% being preferred. The afore-mentioned concentrations are based on the combined weight of the polyvinyl chloride resin and the plasticizer. The substituent R of Compound I can be an alkyl radical containing 1 to 10 carbon atoms, and preferably 3 to 10 carbon atoms, in suitable compounds for plasticizing polyvinyl chloride resins.

The plasticizer materials of the invention can be incorporated into cellulose ester and polyvinyl chloride resins by conventional methods. A preferred method of incorporation is blending by milling on heated rolls.

The subject esters of 2,2-dimethylhydracrylic acid, 3-hydroxy-2,2-dimethylpropyl ester are eminently suited as plasticizers for cellulose ester and polyvinyl chloride resins as these plasticizing esters have low volatility, are resistant to water leaching and are compatible with the resins. In addition to their use as plasticizers as described herein, the subject esters of 2,2-dimethylhydracrylic acid, 3-hydroxy-2,2-dimethylpropyl ester also have utility as synthetic lubricants and as heat transfer oils.

The following examples illustrate further the invention with reference to preferred embodiments thereof, but not with the intention of unduly limiting the same.

*Example 1*

A solution of 175 g. (1.5 moles) of n-hexanoic acid and 153 g. (0.75 mole) of 2,2-dimethylhydracrylic acid, 3-hydroxy-2,2-dimethylpropyl ester in 50 ml. of toluene was refluxed at atmospheric pressure in a reactor fitted with a Dean-Stark trap for 12 hours. A total of 26 ml. (1.44 moles) of water was removed by means of the Dean-Stark trap during the course of the reaction. The low boiling components of the resulting reaction product were stripped off through a 6-inch Vigreaux column at a temperature of 200° C. and at a pressure of 0.4 mm. of mercury. The remaining residue was thereafter distilled by thin film molecular distillation at a temperature of 93 to 107° C. and at a pressure of 48 to 60 microns of mercury. The resulting distillate weighed 259 g. This distillate was 2,2-dimethylhydracrylic acid, 3-hydroxy-2,2-dimethylpropyl ester, di-n-hexanoate and had the following carbon and hydrogen analysis based on the empirical formula, $C_{22}H_{40}O_6$:

Percent C (found) = 65.78, percent C (calculated) = 66.0
Percent H (found) = 10.06, percent H (calculated) = 10.0

*Example 2*

A solution of 470 g. (2.3 moles) of 2,2-dimethylhydracrylic acid, 3-hydroxy-2,2-dimethylpropyl ester and 750 g. (5.2 moles) of 2-ethyl-n-hexanoic acid in 500 ml. of xylene was refluxed at atmospheric pressure in a reactor fitted with a Dean-Stark trap. Xylene was rapidly removed during the refluxing until the reactor temperature rose to 196° C. Thereafter refluxing was continued until 78 ml. (4.3 moles) of water had been removed by means of the Dean-Stark trap, the reactor temperature being about 225° C. The low boiling components of the resulting reaction product were then stripped off through a 6-inch Vigreaux column at a temperature of 200° C. and at a pressure of 0.5 mm. of mercury. The remaining residue was distilled in a molecular still as described in Example 1 to give an 81% yield 2,2-dimethylhydracrylic acid, 3-hydroxy-2,2-dimethylpropyl ester, di(2-ethyl-n-hexanoate). This material had the following analysis based on the empirical formula, $C_{26}H_{48}O_6$:

Saponification Equivalent (found) = 151.7
Saponification Equivalent (calculated) = 152

*Example 3*

Using the method described in Example 1, 153 g. (0.75 mole) of 2,2-dimethylhydracrylic acid, 3-hydroxy-2,2-dimethylpropyl ester and 132 g. (1.5 moles) of n-butyric acid in 100 ml. of toluene were reacted to give a 90% yield of 2,2-dimethylhydracrylic acid, 3-hydroxy-2,2-dimethylpropyl ester, di-n-butyrate.

*Example 4*

Sixty parts by weight of polyvinyl chloride (Geon 101, B. F. Goodrich Company) and 40 parts by weight of 2,2-dimethylhydracrylic acid, 3-hydroxy-2,2-dimethylpropyl ester, di(2-ethyl-n-hexanoate) as a plasticizer were substantially uniformly mixed on heated rolls, and the resulting mixture extruded into a sheet 0.006 inch in thickness. This sheet was clear, relatively strong, flexible and it showed substantially no loss of plasticizer when soaked in soapy water for 96 hours. There was also no significant loss of plasticizer when the film was heated at 100° C. for 24 hours.

*Example 5*

One hundred parts by weight of cellulose acetate butyrate (about 13% acetyl content and about 37% butyryl content) and 30 parts by weight of 2,2-dimethylhydracrylic acid, 3-hydroxy-2,2-dimethylpropyl ester, di-n-butyrate as a plasticizer were substantially uniformly mixed on heated rolls, extruded into sheets about 0.006 inch in thickness, and then granulated. The granulated product was then molded on an injection press into various molded objects. The molded objects had high impact strength, showed substantially no loss of plasticizer when heated at 100° C. for 24 hours, and showed high resistance to extraction by water.

*Example 6*

In the manner described in Example 5, 100 parts by weight of cellulose triacetate can be plasticized with 30 parts by weight of 2,2-dimethylhydracrylic acid, 3-hydroxy-2,2-dimethylpropyl ester, di-n-butyrate, which plasticizer is compatible with the cellulose triacetate. Such plasticized triacetate is suitable for preparing extruded sheets, fibers and other useful forms, the plasticizer therein being resistant to water leaching.

Although the invention has been described in considerable detail with reference to certain preferred embodiments thereof, it will be understood that variations and modifications can be effected within the spirit and scope of the invention as described hereinabove and as defined by the appended claims.

We claim:

1. A plastic composition comprising a resinous material selected from the class consisting of cellulose esters of fatty acids having 2 to 4 carbon atoms and polyvinyl chloride, said resinous material being plasticized with an ester having the formula

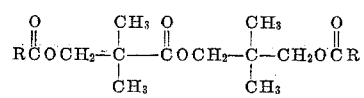

wherein R is an alkyl radical having 1 to 10 carbon atoms.

2. A plastic composition comprising a cellulose ester of fatty acids having 2 to 4 carbon atoms and a plasticizer having the formula:

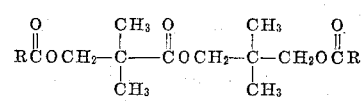

wherein R is an alkyl radical having 1 to 10 carbon atoms, said plasticizer being present in amounts of 10 to 50% by weight based on the combined weights of said cellulose ester and said plasticizer.

3. A plastic composition comprising cellulose acetate butyrate and a plasticizer having the formula:

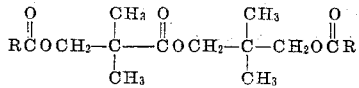

wherein R is an alkyl radical having 3 to 10 carbon atoms, said plasticizer being present in amounts of 10 to 30% by weight based on the combined weights of said cellulose acetate butyrate and said plasticizer.

4. A plastic composition comprising cellulose triacetate and a plasticizer having the formula:

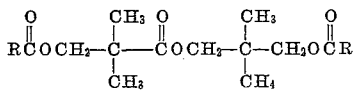

wherein R is an alkyl radical containing 1 to 4 carbon atoms, said plasticizer being present in amounts of 20 to 40% by weight based on the combined weights of said cellulose triacetate and said plasticizer.

5. A plastic composition comprising polyvinyl chloride resin and a plasticizer having the formula:

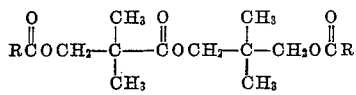

wherein R is an alkyl radical having 3 to 10 carbon atoms, and plasticizer being present in amounts of 30 to 50% by weight based on the combined weights of said polyvinyl chloride resin and said plasticizer.

6. A plastic composition comprising cellulose acetate butyrate having a 5 to 20% acetyl content and a 25 to 50% butyryl content plasticized with 2,2-dimethylhydracrylic acid, 3-hydroxy-2,2-dimethylpropyl ester, di-n-butyrate, the said plasticizer being present in amounts of 10 to 30% by weight based on the combined weights of said cellulose acetate butyrate and the said plasticizer.

7. A plastic composition comprising cellulose triacetate plasticized with 2,2-dimethylhydracrylic acid, 3-hydroxy-2,2dimethylpropyl ester, di-n-butyrate, the said plasticizer being present in amounts of 20 to 40% by weight based on the combined weights of said cellulose triacetate and the said plasticizer.

8. A plastic composition comprising polyvinyl chloride resin plasticized with 2,2-dimethylhydracrylic acid, 3-hydroxy-2,2-dimethylpropyl ester, di(2-ethyl-n-hexanoate), the said plasticizer being present in amounts of 30 to 50% by weight based on the combined weights of the said plasticizer and said polyvinyl chloride resin.

9. A compound having the formula:

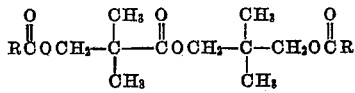

wherein R is an alkyl radical containing 1 to 10 carbon atoms.

10. 2,2 - dimethylhydracrylic acid, 3 - hydroxy - 2,2-dimethylpropyl ester, di-n-butyrate.

11. 2,2 - dimethylhydracrylic acid, 3 - hydroxy - 2,2-dimethylpropyl ester, di-n-hexanoate.

12. 2,2 - dimethylhydracrylic acid, 3 - hydroxy - 2,2-dimethylpropyl ester, di(2-ethyl-n-hexanoate).

No references cited.